W. E. JONES.
AUTOMOBILE SIGNAL.
APPLICATION FILED JAN. 23, 1914.
1,199,560.
Patented Sept. 26, 1916.
5 SHEETS—SHEET 1.
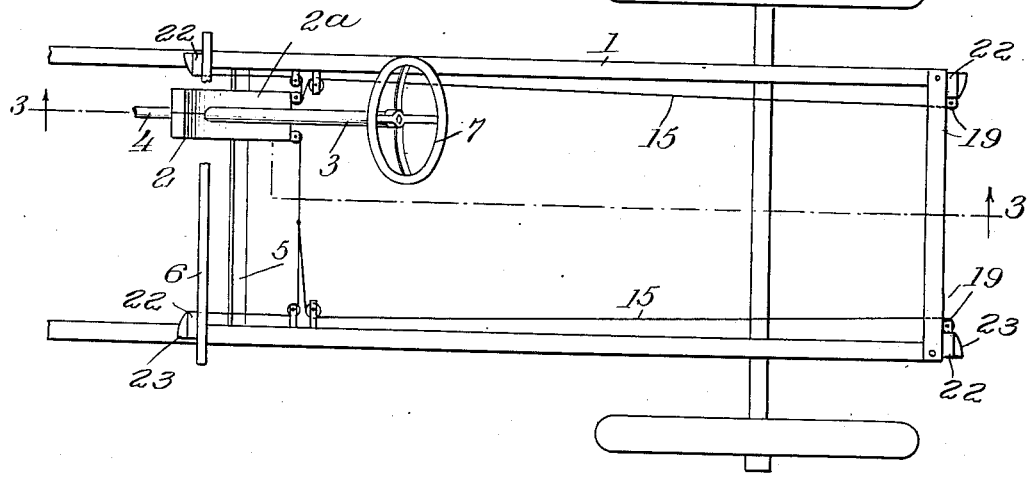
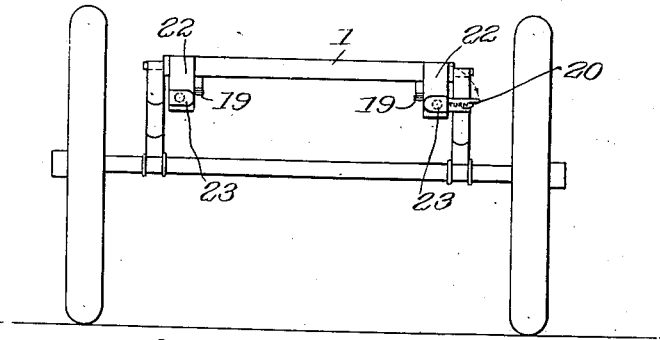
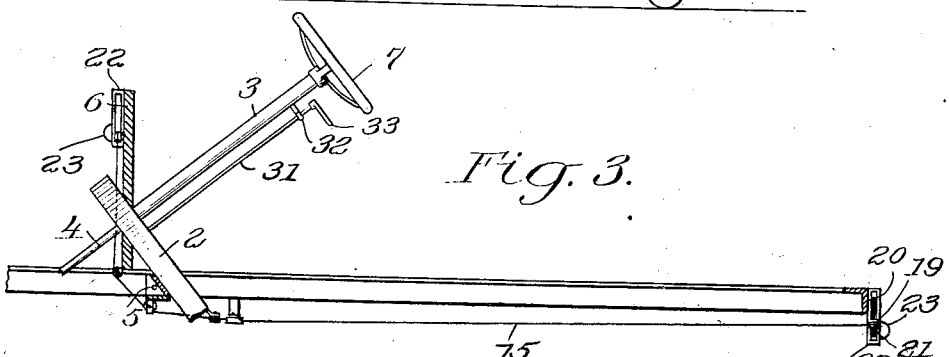
WITNESSES
INVENTOR
William E. Jones,
BY
ATTORNEYS

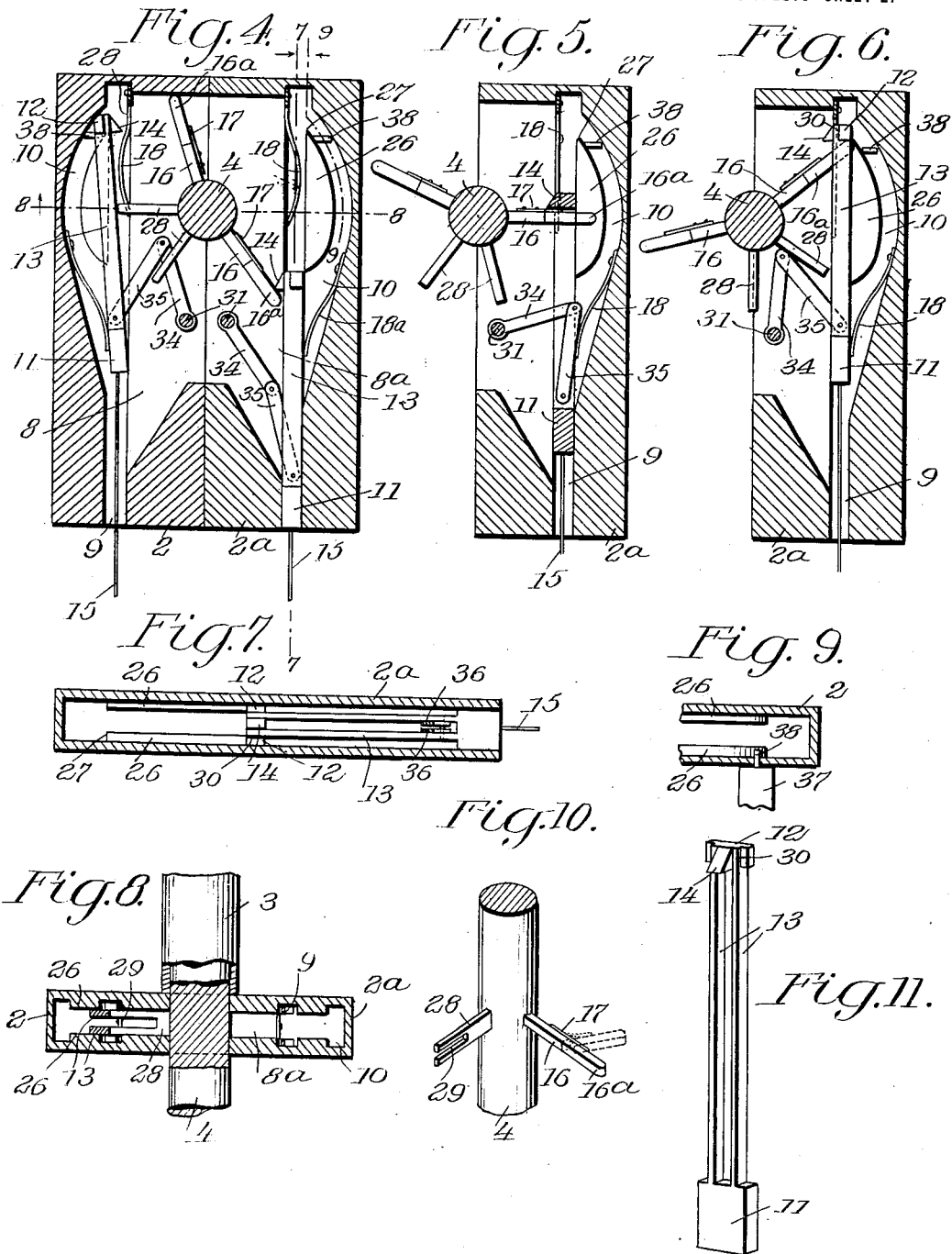

W. E. JONES.
AUTOMOBILE SIGNAL.
APPLICATION FILED JAN. 23, 1914.
1,199,560.
Patented Sept. 26, 1916.
5 SHEETS—SHEET 3.
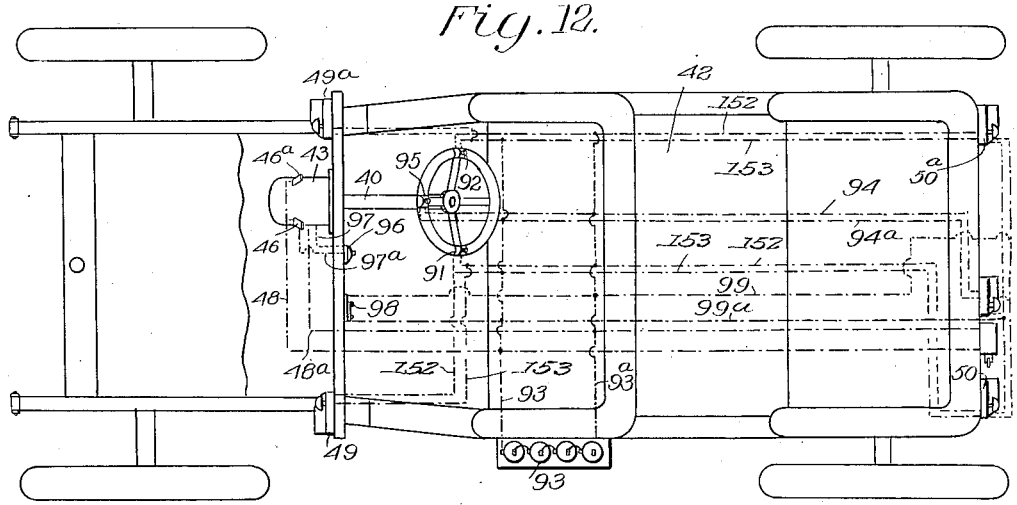
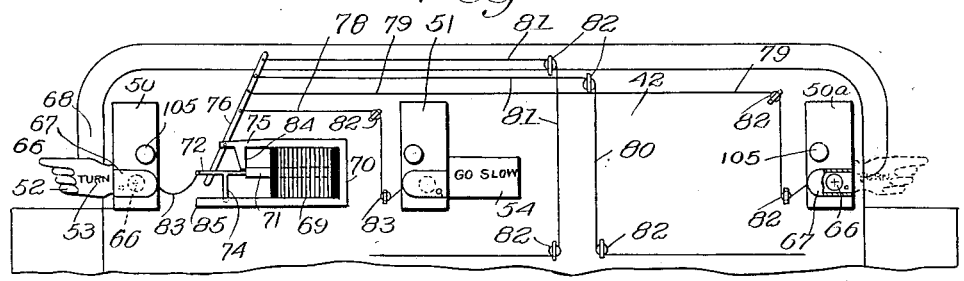
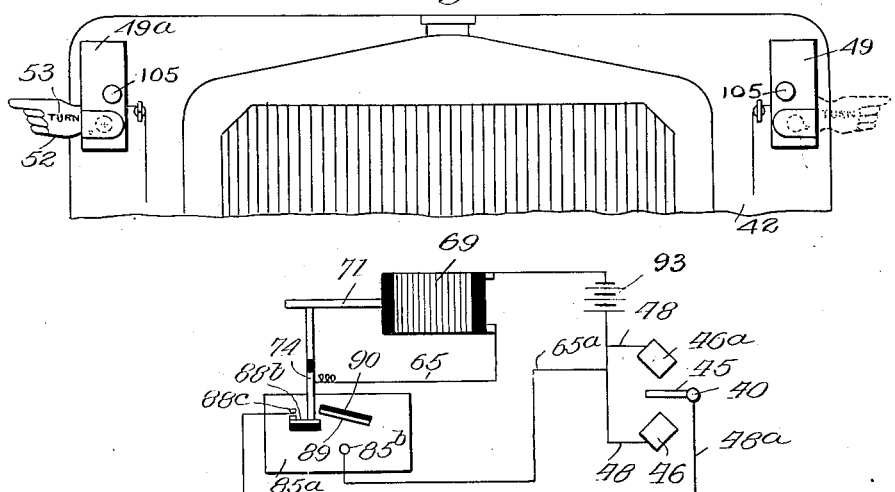
WITNESSES
N. E. Dade
O. E. Traver
INVENTOR
William E. Jones.
BY Munn & Co.
ATTORNEYS

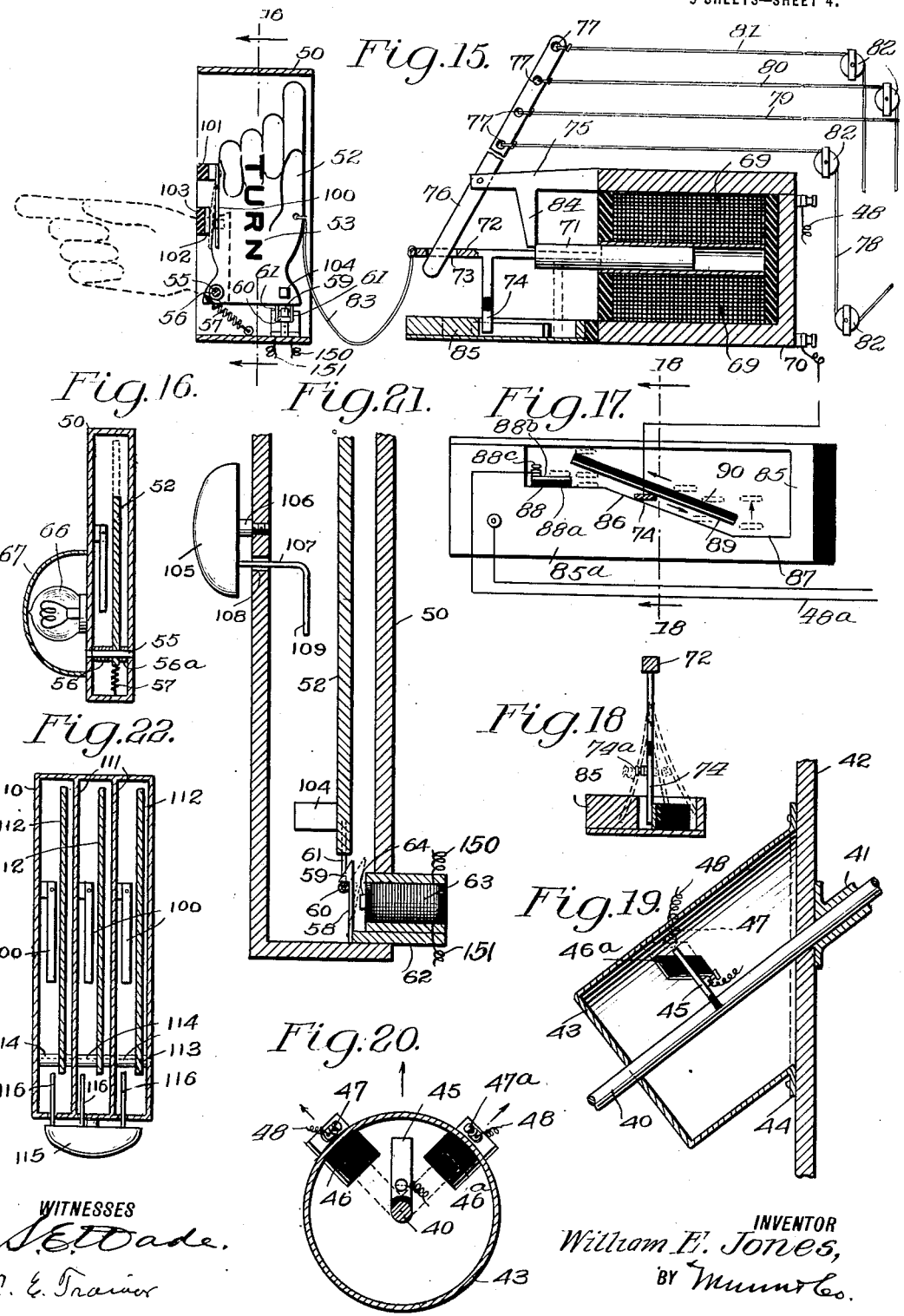

W. E. JONES.
AUTOMOBILE SIGNAL.
APPLICATION FILED JAN. 23, 1914.
1,199,560.
Patented Sept. 26, 1916.
5 SHEETS—SHEET 5.
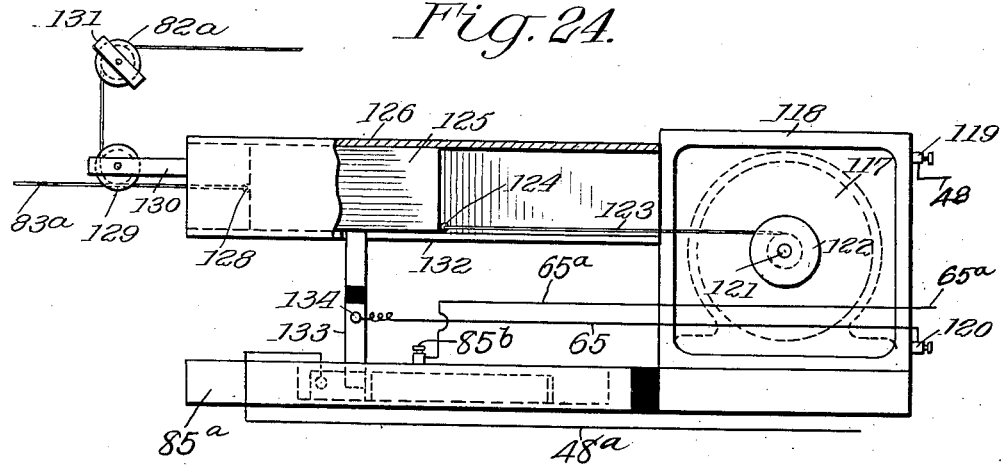
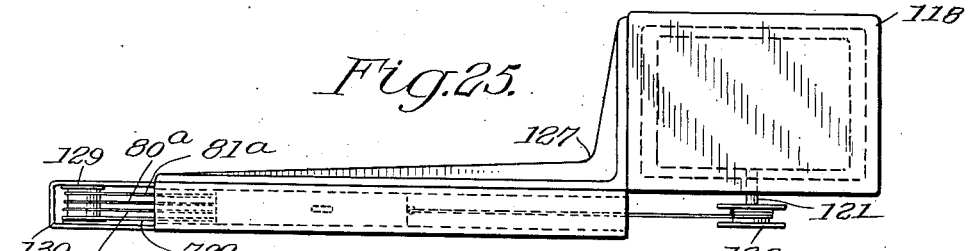
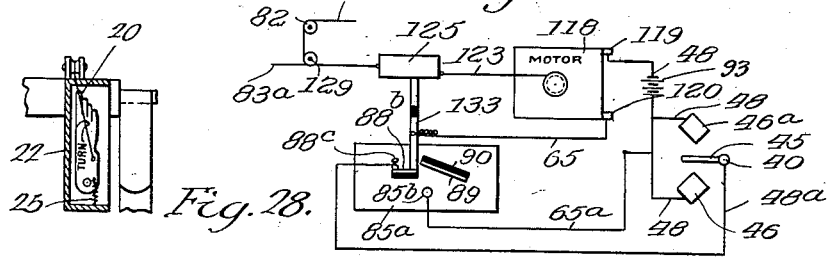
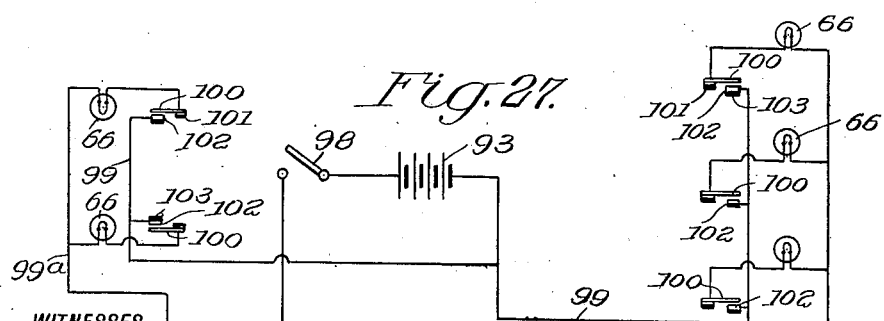
WITNESSES
S. E. Wade.
A. E. Tranor
INVENTOR
William E. Jones
BY Munn & Co.
ATTORNEYS

UNITED STATES PATENT OFFICE.

WILLIAM EZEKIEL JONES, OF ST. LOUIS, MISSOURI.

AUTOMOBILE-SIGNAL.

1,199,560.  Specification of Letters Patent.  Patented Sept. 26, 1916.

Application filed January 23, 1914. Serial No. 813,927.

*To all whom it may concern:*

Be it known that I, WILLIAM E. JONES, a citizen of the United States, and a resident of St. Louis and State of Missouri, have made certain new and useful Improvements in Automobile-Signals, of which the following is a specification.

My invention is an improvement in automobile signals, and has for its object to provide a series of signals adapted to be arranged on an automobile or like vehicle in such manner that when in operative position, they will indicate to the occupants of following vehicles, foot traffic and traffic officers in front, certain indications in regard to the intentions of the driver of the vehicle provided with the signal, as for instance, that the driver intends to turn in either direction or to slow up, or to communicate any other information, and wherein the signals are normally held in inoperative or safety position, by means of releasable latch mechanism operable at will to release the signals, and wherein other mechanism is provided for returning the exposed signals to inoperative position, the said mechanism being controlled by the movement of the steering wheel to turn the vehicle.

A further object of the invention is to provide illuminating means adjacent to each signal for illuminating the said signal when in operative position.

A further object is to provide mechanism controlled by the movement of the signals into and out of operative position for actuating the illuminating means adjacent to the said signals.

A further object is to provide an audible signal adjacent to each of the first-named signals and so arranged that when the visible signal moves into operative position it will actuate the audible signal to call the attention of occupants of following vehicles to the information intended to be conveyed by the visible signal.

A further object of the invention is to provide mechanism for operating the signal either manually controlled or electrically controlled, the said mechanism in each instance however, being controlled by the movement of the steering wheel.

In the drawings: Figure 1 is a diagrammatic top plan view of a portion of the frame of an automobile with the improved signals in place, Fig. 2 is a rear view of Fig. 1, Fig. 3 is a section of Fig. 1 on the line 3—3, and looking in the direction of the arrows, Fig. 4 is a horizontal section of the plunger casing, showing the parts in one position. Figs. 5 and 6 are similar views showing the parts in other positions, Figs. 7, 8 and 9 are sections on the lines 7—7, 8—8 and 9—9, respectively, of Fig. 4, looking in the direction of the arrows, Fig. 10 is a perspective view of a portion of the steering post, Fig. 11 is a perspective view of one of the plungers, Fig. 12 is a diagrammatic top plan view of an automobile showing a modified construction, Fig. 13 is a partial rear view of an automobile showing the rear signals, Fig. 14 is a similar view of the front of an automobile, showing the front signals, Fig. 15 is a sectional view of a signal, and the mechanism for returning the signals to inoperative position, Fig. 16 is a section on the line 16—16 of Fig. 15, Fig. 17 is a side view of the signal returning mechanism shown in Fig. 15, Fig. 18 is a section on the line 18—18 of Fig. 17, looking in the direction of the arrows, Fig. 19 is a vertical section of the switch casing used in connection with the steering post, Fig. 20 is a transverse vertical section of the said switch casing, Fig. 21 is an enlarged section through a signal, showing the releasing mechanism for the signal, and mechanism in connection with the said signal for operating a bell or the like, Fig. 22 is a vertical section of a modified construction, Fig. 23 is a diagrammatic view showing the wiring of the returning mechanism for the signals, Fig. 24 is a side view of a modified construction for returning the signals to inoperative position, with parts broken away, Fig. 25 is a top plan view of Fig. 24, Fig. 26 is a diagrammatic view showing the wiring for the returning mechanism of Figs. 24 and 25, and Fig. 27 is a diagrammatic view of the wiring for the illuminating means for the signals, Fig. 28 is a detailed view of the mechanically operated signal showing the spring for projecting it to operative position.

The embodiment of the invention shown in Figs. 1 to 11 inclusive, is the simplest embodiment of the invention, the returning mechanism for the signals being mechanically controlled. The said embodiment is shown in connection with the frame 1 of an automobile, and the signals are connected with the rear of the automobile, and with the front thereof.

Each of the signals 20 is arranged within a casing 22 and the said signals are four in number, and are arranged at the corners of the vehicle, two signals being arranged at the rear of the vehicle and two at the front. Each signal in the present instance is cut to represent a pointing hand, and the said signals are pivoted in the casings 22 in such manner that they may be swung into the casing into approximately vertical or safety position, or out of the casing into approximately horizontal or danger position, each casing having the outer side open to permit the movement above mentioned.

Each signal may, if desired, be provided with the legend "Turn" on its outer face, the legend being so arranged that when the signal is in danger position, the legend will be horizontal and will be outside of the casing. Each signal has a coil spring 25, arranged on the outer side of the pivotal connection of the signal in such manner that the spring will swing the signal into danger position when the signal is released.

A flexible member 15 as for instance, a wire or cord, is connected with each signal and each of the said flexible members passes from the signal over pulleys 19 to a connection with mechanism for returning the signals to safety position. The said returning mechanism is arranged within the sectional casing 2—2ª supported by the frame of the vehicle at the steering post bearing sleeve 3, and the steering post 4 passes through the casing as shown in Figs. 3 and 4. The plane of the casing is perpendicular to the post and the casing is supported by a cross plate 5, the said plate being arranged in inclined position.

The front or upper end of the casing extends through the dash 6 of the vehicle, and the steering wheel 7 is secured to the steering post in the usual manner. Each section 2 and 2ª of the casing is recessed at its inner edge and the recesses 8 and 8ª coöperate to form a chamber. Within the chamber the upper and lower walls of the sections of the casing are grooved, and the grooves register to form at each side of the steering post, a straight passage 9 and a curved passage 10, which communicates at each end with the adjacent end of the adjacent straight passage 9.

Each passage 9 opens at the rear or lower end of the section and a plunger is mounted for movement in each of the straight passages and in the adjacent curved passage. Each of the plungers (Fig. 11) comprises a main or body portion 11 and a head 12 connected to the main or body portion by means of parallel laterally spaced connecting bars 13, the said body portion, head and connecting bars, being however, an integral structure. The main or body portion 11 of each plunger and the head 12 of the same are of the same width and the passages 9 and 10 of each section are of a depth corresponding to the width of the plunger, and the said head and body engage the opposite grooves constituting the passage to guide the plunger in its movement within the casing.

Each plunger is provided at the head with a laterally extending catch 14, and each catch has the face adjacent to the body perpendicular to the plunger and the other face inclined, as shown in Figs. 4 to 6 inclusive. The flexible members 15 of the signals at each side of the automobile are connected to the adjacent plunger at the lower end of the casing as shown in Figs. 4, 5 and 6, and the pulleys 19 over which the flexible members pass are so arranged that when the plungers move longitudinally of the casing, in one direction, the signals will be swung into their casings against the resistance of the springs. Thus it will be seen that the signals at each side of the vehicle are connected to a common plunger, the arrangement being such that the signals at either side of the vehicle may be returned to safety position independently of the signals at the other side.

The plungers are moved in one direction by the springs connected with the signals to which the plungers are connected and in the opposite direction by the steering post. The steering post is provided within the chamber 8—8ª with two radial arms, each arm consisting of two sections 16 and 16ª. The section 16ª of each arm is connected to the section 16 of the arm by a rule joint, so that the said section 16ª of the arm may swing in one direction, but cannot swing in the opposite direction beyond a position in alinement with the section 16.

A plate spring 17 is secured to the section 16 of each arm at one end, and the free end of each spring bears against the section 16ª of the arm to normally hold the sections in alinement. The arms 16—16ª are of such thickness that they may pass freely between the connecting bars 13 of the plunger. A plate spring 18 is secured to the casing in each of the passages 9, and each of the springs is adapted to engage the adjacent plunger to move the plunger from the passage 9 to the passage 10. The springs 18 bear against the inner sides of the plungers when the plungers are moving toward the upper ends of the passages 9, and hold the plungers against the outer walls of the said passages 9, until the head of the plunger has moved beyond or above the apices 27 of the elevations 26 between the grooves at each face of the chamber, which form the passages 9 and 10. The apices act as cams or switches for deflecting the heads of the plungers from the passages 9 to the passages 10. Each of the said elevations 26 comes to a point or apex near the front end of the casing section, and the said point causes the head 12 of the plunger to move in the passage 10, as the plunger moves toward the rear end of the casing.

An arm 28 extends radially from the steering post adjacent to each of the arms 16—16ª and in rear thereof, and each of the said arms 28 is of greater length than the perpendicular from the steering post to the adjacent wall of the adjacent passage 9. The plungers are moved toward the front of the casing 2—2ª by means of the arms 16—16ª. The hinge connection between the section of the arm prevents the outer section from swinging rearwardly with respect to the inner section, and each arm 16—16ª is arranged to extend between the connecting bars of the adjacent plungers and to engage the head of the plunger to move the plunger when the steering post is oscillated in the proper direction.

Referring to Figs. 4, 5 and 6, it will be noticed that in Fig. 4 the arm 16—16ª at the right of the said figure has just engaged the head of the adjacent plunger. As the steering post is oscillated toward the left, the arm will move the plunger forwardly, as shown in Fig. 5 until the head of the plunger is adjacent to the apices 27 of the enlargements 26. As soon as the head passes beyond the said apices, the adjacent spring 18 will act to move the plunger laterally into the passage 10.

Just as the free end of the outer section 16ª of the arm 16—16ª is leaving the head, the free end of the adjacent arm 28 begins to contact with the connecting bars of the said plunger, and as the steering post is further oscillated toward the left, the said arm 28 and the adjacent spring 18 will move the head of the plunger outwardly away from the steering post and into the upper end of the adjacent passage 10. Within each passage 10 a latch 38 is arranged, the said latch being near the apices 27, and in position to engage the head of the plunger, to hold it against rearward movement under the pull of the springs connected with the signals.

The latches 38 when released will permit the plungers to move rearwardly. It is obvious that any mechanism may be provided for releasing the latches and such mechanism may be arranged wherever convenient. As long however, as the said latches are in position to be engaged by the head, the plunger cannot move rearwardly. A latch bar 37 supports each latch, and each of the said latches or lugs 38 is movable through an opening in the casing 2—2ª, it being understood that a latch is provided for each passage 10.

When the plunger is in the position shown at the left of Fig. 4, the signals are in safety position, that is, they are swung into their respective casings and as long as the plunger remains in this position, the signals will be so held in inoperative position. It will be understood that normally the plungers are both in the position shown at the left of Fig. 4, that is, held from rearward movement by the latches 38. When either latch is released, the springs connected with the signals pertaining to the plunger will swing the signals into danger position, and will draw the plunger rearwardly, the head of the plunger moving in the adjacent passage 10 until the plunger reaches the position shown at the right of Fig. 4. The plate spring 18ª which is connected with the casing at the outer wall of each passage 10, presses the adjacent plunger against the inner wall of the passage 9, to insure the proper engagement of the plunger by the arm 16—16ª.

When the steering post 4 is operated to move the plunger at the right of Fig. 4 toward the top of the casing, the arm 16—16ª at the left of the steering post may swing by the plunger at the left without affecting the same. The free end of the outer section of the arm engages the beveled face of the catch 14; the said outer section will be swung at an angle to the inner section to permit the arm to move by the head of the plunger. The springs 18 have their free ends slotted longitudinally as indicated in Figs. 4 to 6 to permit the passage of the arm 16—16ª.

It will be noticed from an inspection of Fig. 11 that each end of the head 12 of the plunger is rabbeted as shown at 30 and that the catch 14 is of a width corresponding to the width of the space between the bars 13. In other words, the catch is just wide enough for engagement by the arms 16—16ª. The arms 28 are for supplementing the springs 18, and for positively insuring that the plunger heads will pass outside of the apices 27 of the elevations 26. Each of the signals 20 is adapted to be illuminated by means of an electric light arranged within a reflector and protecting casing 23, which will be later described.

The operation is as follows:—When the driver decides to turn the vehicle, and wishes to display a signal announcing his intention, he will release the latch 38 of the plunger at that side of the vehicle toward which he intends to turn. As soon as the latch is released, the spring connected with the signals pertaining to the said plunger will swing the signals out of their respective casings into horizontal or danger position, thus announcing to all concerned that the vehicle will turn in the direction indicated by the signals. The signals remain exposed until the driver operates the steering post to straighten the wheels. As for instance in Fig. 4, the signals at the right of the vehicle are in danger position, and the steering post is holding the wheels to turn the vehicle to the right.

As soon as the vehicle has turned, the driver will turn the steering post to the left, and the arm 16—16ᵃ at the right of the steering post will engage the head of the adjacent plunger and will move it longitudinally of the passage 9 toward the front of the casing 2—2ᵃ until it passes the points 27, when the spring 18 and the adjacent arm 28 will push the head outwardly into the passage 10, where the head will be engaged with the adjacent latch 38 to hold the plunger with the signals in safety position.

Mechanism is also provided for permitting the driver to return the signals to safety position without turning the steering wheel, for instance in case the driver should change his mind in regard to turning after he had displayed his signals announcing his intention. The said mechanism comprises a shaft 31 journaled in the casing adjacent to each plunger, and in a bearing arm 32 on the steering post sleeve 3. The said shafts are parallel with the steering post, and each shaft is provided with an arm or handle 33 at its upper end for convenience in operating the shaft.

Within the casing 2—2ᵃ each shaft is provided with a rigid radial arm 34, and the free end of each arm is connected to the adjacent plunger by means of a link 35. Each of the links is pivoted to the plunger between the connecting bars 13 and adjacent to the main or body portion 11 of the plunger. Referring to Fig. 4, it will be evident that when the signals at the right of the vehicle are in danger position the shaft 31, the arm 34 and the link 35 will take the position shown at the right of the said figure. Should the driver desire to return the signals to safety position, without moving the steering post he will oscillate the shaft 31 by means of the handle connected thereto in a direction to swing the arm 34 toward the top of the casing, thus the plunger will be moved as indicated in Figs. 5 and 6 into the position shown at the left of Fig. 4 and in engagement with its latch.

In the embodiment of the invention shown in Figs. 12 to 20 inclusive, the signals are returned to inoperative position, by electrically operated mechanism, and the said mechanism is electrically controlled through the steering post. In this construction, the steering post 40 is journaled in a bearing 41 on the dash of an automobile 42 in inclined position, and a switch casing 43 of approximately cylindrical form incloses a portion of the post at the dash. The edges of the casing are flanged as shown at 44, and secured to the front face of the dash.

The steering post is provided with a flexible switch arm of conducting material insulated at its base from the steering post, and the said arm is provided with a binding post 45ᵃ for a purpose to be later mentioned. Contact plates 46 and 46ᵃ are supported by the switch casing, and each plate consists of a lower portion of conducting material and an upper portion of non-conducting material. The plates are passed through openings in the wall of the switch casing.

Each plate is provided with a binding post 47 and 47ᵃ respectively outside the casing. The plane of each plate is inclined with respect to the switch arm 45, and is so arranged that the said arm will engage the face of the plate at approximately the center thereof. The arrangement is such that when the steering post is turned in one direction, the switch arm 45 will engage the upper face of the plate toward which the post is turned, and will move in contact with the said face of the plate until it passes over the upper end of the plate. When the steering post is turned in the opposite direction, the switch arm will engage the under face of the plate and will move in contact therewith until it passes off the lower edge of the plate.

The binding posts 47 and 47ᵃ are connected with the under or conducting portion of the plates, and a lead wire 48 is connected with each binding post. A lead wire 48ᵃ is connected to the binding post of the switch arm 45, and the said lead wires 48 and 48ᵃ are portion of an electrical circuit, to be described. Signal casings 49 and 49ᵃ are arranged at the front of the vehicle, the said casings being at the ends of the dash, and other signal casings 50 and 50ᵃ are arranged at the rear of the vehicle, the said casings being at opposite sides thereof.

The signals 52 in the casings 49—49ᵃ—50—50ᵃ are arranged to indicate the turning of the automobile and if desired an additional signal casing 51 may be arranged intermediate the sides of the vehicle at the rear thereof, the said signal indicating caution. The signals 52 may be of any character, in the present instance being in the representation of a pointing hand and each of the said signals may bear the legend "Turn". The signal 54 in the casing 51 is in the present instance merely a plate on which is the legend "Go slow". It is obvious however, that it might bear any other desired legend.

The five signals are mounted in the same manner and are operated in the same manner and hence but one will be described, namely, the signal 52 in the casing 50. Each of the casings as shown in Fig. 16 is of box-like form having its outer side open and the signal is pivoted on a journal pin 55, arranged transversely of the casing, arbors 56 and 56ª being arranged on the pin between the signal and the adjacent sides of the casing. The signal is pivoted at its lower outer corner as shown, in order to swing outward with the index finger in approximately horizontal position or to swing upward or inward with the index finger in approximately vertical position, the former position being shown in dotted lines and the latter in full lines in Fig. 15.

A coil spring 57 is connected at one end to the signal at the outer corner and outside of the journal pin, and at the other end to the casing in such manner that the spring acts normally to swing the signal into the dotted line position of Fig. 15. Each signal is normally held in inoperative position against the resistance of the spring by means of a spring plate 58 having at its upper end a catch 59 for engaging over a roller 60, which is journaled between arms 61 extending longitudinally from the signal at the inner corner thereof.

The lower end of the plate spring is secured to the inner end of a casing 62, which is supported immediately in rear of the signal casing and extending into the said casing below the signal. An electric magnet 63 is arranged within the casing 62 and the core 64 of the magnet is in position to act upon the plate spring 58 as an armature, to release the catch from the roller when the magnet is energized. It will be evident that when the magnet is energized the upper end of the plate spring will be drawn toward the magnet, thus releasing the roller from the catch.

The terminals 150 and 151 of the winding of the magnet are interposed in an electrical circuit to be presently described, the magnets of those signals which are at the same side of the vehicle being interposed in the same circuit, so that all of the signals at each side of the vehicle may be simultaneously released. The magnet of the signal 54 is interposed in an independent circuit.

An illuminating device in the present instance, an incandescent globe, 66 is arranged adjacent to each signal casing in position to illuminate the signals, and the legend thereon, when the signal is in operative position. Each globe 66 has a shield and reflector 67 partially inclosing the same, and directing the rays of light from the globe toward the signal, each of the said shields and reflectors being supported by the signal casing.

All of the five signals are returned to inoperative position by an electromagnet 69 arranged within a casing 70 mounted at any suitable point, in the present instance at the rear of the vehicle and between the signal casing 51 and the signal casing 50. The core 71 of the electromagnet 69 is provided with an extension 72 having a slot 73 near its outer end and having a laterally extending movable switch arm 74 insulated from the extension. The switch arm 74 is provided with a binding post 74ª, and the said arm is adapted for coöperation with a switch, to be later described.

A bracket arm 75 extends longitudinally from the casing 70 above the core, and a lever 76 is pivoted to the bracket arm intermediate the ends of the lever. The lower end of the lever engages the slot 73 before mentioned, and the upper end of the lever is provided with a series of openings 77 for the attachment of flexible members 78, 79, 80 and 81. Each of the said flexible members connects the lever with a signal, and direction elements 82 as for instance pulleys, are provided for guiding the flexible members between the respective signals and the lever.

A flexible member 83 connects the end of the extension 72 with the adjacent signal 52 in the casing 50. The flexible members 78—79—80—83 are so arranged that when the lever 76 is swung in one direction, traction will be made upon all the cords in a direction to swing the signal to which the cord is connected into its casing.

The lever 76 is moved by the core 71 of the magnet 69 and the magnet is energized to cause the core to move within the same by means of switch mechanism to be later described. The said switch mechanism is in the form of a push button preferably arranged on the steering wheel, the operation of which initiates the movement of the core. The continued movement of the core is brought about by the switch with which the arm 74 coöperates.

The switch 85 is connected with the under side of the casing 70, and the said mechanism comprises a contact plate 85ª having an inclined or beveled track 86, connecting at its lower and upper ends with a straight and horizontal track 87 and 88 respectively, the said tracks 87 and 88 being parallel and offset laterally with respect to each other. A contact bar 89 is arranged parallel with the inclined track 86, the said contact bar being integral with the switch plate 85ª and having attached to the upper face thereof an insulating block or plate 90.

An insulating block or plate 88ª is arranged at the track 88, and at the end thereof remote from the track 86, and a contact plate or strip 88ᵇ is supported by the block, the said plate or strip having a binding post 88ᶜ. The free end of the flexible switch arm 74 contacts with the strip or plate 88ᵇ when the core 71 is in the position shown in full lines in Fig. 15, and when the core is moving into the magnet coil the switch arm moves between the inclined plate or bar 89 and the inclined track 86 until the switch arm passes out from beneath the lower end of the said bar 89.

As the core moves out of the coil, the switch arm travels above the insulating block 90, as indicated in dotted lines in Fig. 17 until the extremity of the arm passes off the upper end of the said block, and drops into contact with the strip 88$^b$. The wiring of the connections between the magnet 69 and the switch just described, is shown in Fig. 23 wherein it will be seen that the switch arm 45 of the steering post is connected to the binding post 88$^c$ of the contact strip 88$^b$ by means of a lead wire 48$^a$, while the lead wires 48 from the contact plates 46 and 46$^a$ are connected with one of the terminals of the magnet 69. The other terminal of the magnet is connected to the binding post on the switch arm 74 by means of a lead wire 65.

A lead wire 65$^a$ is connected at one end to the binding post 85$^b$ of the contact plate 85$^a$, and the other end of the said lead wire is branched on the wire 48 adjacent to the contact plate 46 and between the said contact plate and the plate 46$^a$. It will be noticed from an inspection of Fig. 23 that the wire 48 which connects the one terminal of the magnet 69 with the contact plates 46 and 46$^a$ branches near the contact plates, one branch being connected to each plate. The wire 65$^a$ is connected to that branch which goes to the plate 46, and a battery 93 is arranged in the said wire 48 between the junction of the branch wires and the magnet 69. It will be evident that when the steering post 40 is turned in either direction to turn the vehicle, the switch arm 45 will contact with the upper face of one of the contact plates 46 or 46$^a$ and the switch arm moves in contact with the nonconducting upper face of the plate until it passes off at the upper end of the said plate.

As the steering wheel is moved in the reverse direction to straighten out the wheels, the flexible switch arm will contact with the conducting under face of the plate, and will close the circuit through the magnet 69, the current passing by one of the contact plates 46 or 46$^a$ as the case may be, and the lead wire 48 to and through the winding of the magnet, and by way of the lead wires 65 to the switch arm 74. The said arm is in contact with the strip 88 and the current will pass by way of the said strip and the binding post 88$^c$ and the lead wire 48$^a$ to the switch arm 45, thus completing the circuit. The core will begin immediately to move into the coil, and when the switch arm 74 passes off of the contact strip 88$^b$, the circuit through the coil would be broken were not some mechanism provided to retain the circuit closed. The said mechanism is the contact bar 89 with which the flexible switch arm 74 contacts should it move out of contact with the strip 88$^b$. The current now passes from the switch arm 74 to the contact strip or plate or bar 89, and by way of the lead wires 65$^a$ to the magnet. Thus the current through the magnet is maintained until the core has been entirely withdrawn within the magnet and the switch arm passes off at the lower end of the contact bar 89.

The lever 76 will be swung in a direction to make traction on the flexible members 78—79—80—83 to simultaneously return all of the signals to inoperative position that are not already in such position. It will be understood that when the signals at one side of the core are released and the returning mechanism is operated to return, those flexible members which are connected to the signals in safety position, will merely be tightened to take up the slack or looseness in the said flexible members.

As before stated, it is necessary to provide mechanism for returning the signals to safety position, regardless of the movement of the steering wheel, and with the above construction such mechanism is provided for by arranging a push button 96 in convenient position to be operated by the driver, in the present instance, the button being on the dash. Lead wires 97 and 97$^a$ lead from the terminals of the push button and are branched on to the lead wires 48 and 48$^a$ in parallel with the switch arm 45 and the contact plates 46—46$^a$.

It will be evident that when the button is operated to close the circuit, the magnet 69 will be energized as above described to operate the lever 76 to return those signals which are in danger position. As above mentioned, an illuminating means is arranged adjacent to each signal, the said means being in the present instance, mounted on the signal casings. Each of the said illuminating means comprises an incandescent globe 66, and a shield or reflector 67 so arranged that when the signal is in danger position as indicated in dotted lines in Fig. 13, the rays will be thrown directly on to the outer exposed face of the signal.

In Figs. 24 and 25 a motor is provided for returning the signals to inoperative position. The motor 117 is arranged within a casing 118 and binding posts 119 and 120 are provided on the casing for connection with the motor. The motor shaft 121 is provided with a reel 122, upon which winds one end of a flexible member 123, as for instance, a cord or wire, and the other end of the flexible member is connected with an eye 124 on a block or weight 125, which moves in the guide casing 126 connected to the motor casing by an angle bracket 127. Both ends of the guide casing are open, and flexible members 78$^a$, 79$^a$, 80$^a$, 81$^a$ and 83$^a$ extend from the opposite end of the guide casing from the motor, each of the said members having one end connected with an eye 128 on the block and the other end with the signal.

The flexible members pass over a guide pulley 129 supported by a substantially U-shaped bracket 130 at the end of the guide casing remote from the motor, and over guide pulleys 82ª supported in brackets 131 to the signals, the pulleys 129 and 82ª being direction elements for the flexible members. The guide casing 126 is provided with a longitudinally extending slot 132 in one side, and a switch arm 133 is connected with the block, the said arm extending through the slot. The arm is insulated from the block and is provided with a binding post 134.

The free end of the switch arm coöperates with the switch shown in Fig. 17, and the said arm is flexible, similar in all respects to the switch arm 74, before described, and operating in the same manner. The wiring for the construction shown in Figs. 24 and 25 is shown in Fig. 26 and is substantially the same as that shown in Fig. 23. A lead wire 48 is connected at one end with one of the terminals 119 of the motor, and at its other end the said wire is branched, the branches being connected to the contact plates 46 and 46ª. Another lead wire 65ª connects the binding post 85ᵇ on the contact plate 85ª with that branch of the wire 48 which goes to the contact plate 46. A battery 93 is arranged in the lead wire 48 between the junction of the branches and the binding post 119. A lead wire 65 connects the terminal 120 of the motor with the switch arm 133, and the said motor takes the place of the coil 69. The operation is in all respects the same, the motor rotating to wind up the flexible member 123 to move the block in a direction to swing the signals into inoperative position, and the signals are moved into operative position by the springs connected therewith.

In Fig. 15, mechanism is shown for permitting each signal to operate its illuminating means as the signal moves into operative position. The said construction comprises a switch consisting of a spring plate 100, connected to the signal casing and insulated therefrom by means of an insulating support 101. The spring plate is adapted to coöperate with a contact plate 102 mounted on an insulated support 103, arranged below the support 101. The free end of the spring plate is normally held by its own resiliency out of contact with the fixed plate 102, and the terminals of the circuit in which the lamp 66 adjacent to the signal is interposed, are connected with the plates 100 and 102.

A cam 104 is provided on the signal for engaging the movable element 100 of the switch, to force the said element into contact with the element 102 to complete the circuit through the lamp. This cam or switch arm 104 is so arranged that the plate 100 will be held in contact with the plate 102 by the cam when the signal is in operative position, as shown in dotted lines in Fig. 15.

If desired, an audible signal may be used in connection with the visual signal as for instance, a bell 105 connected with the casing by means of a post 106. The bell may be in any convenient position, being in the present instance outside the casing, and the clapper (not shown) of the bell is operated by means of an angle bar, consisting of an arm 107, extending through a slot 108 in the casing wall and connected to the clapper, and an arm 109 extending into position for engagement by the cam or operating arm 104, before mentioned. The arm 109 is arranged to be engaged by the cam during the movement of the signal into operative position, and before the said cam engages the switch plate 100.

In Fig. 22, a modified construction is shown, wherein a casing 110 is provided, separated into three compartments by partitions 111. The signals 112 are journaled on a journal pin 113, which is arranged transversely of the casing, and passes through the partitions, and the signals are held in proper position on the pin by means of arbors or sleeves 114. With this construction, two of the signals 112 may be arranged in opposite directions, and the said signals may be representations of pointing hands, bearing the legend "Turn" while the other signal may bear the signal "Go slow". The signals are operated both as to release and return, in precisely the same manner as those already described. With this construction, the bell 115 is arranged below the casing, and the clapper is designed to be operated by means of any or all of three arms 116, the said arms extending into the respective compartments of the casing.

Any suitable mechanism may be provided for engaging the arms to operate them as for instance, a cam or arm similar to the arm 104 shown in Fig. 21. Each signal 112 may be arranged to actuate its own light circuit, in the same manner as shown in Fig. 15. The movable switch arms 100 are shown in the said construction, one of the said arms being arranged in each compartment.

It will be understood that preferably the arrangement is such that all of the signals at each side of the automobile may be simultaneously released, to permit the springs connected therewith to move them into operative or danger position. In the construction of Figs. 1 to 11 the releasing mechanism is a latch bar 38, while in the construction shown in Figs. 12 to 26, the signals are held in safety position by releasable latches, which are operated electrically to release the signals. The magnets 63 of the releasing mechanism of the signals at each side of the vehicle are interposed in the same circuit, preferably in parallel, and in such manner that all of the magnets in each circuit may be simultaneously energized.

Push buttons 91 and 92 are arranged on the steering wheel at opposite sides thereof, the push button 91 being at the left of the driver and the push button 92 at the right. Lead wires 152 and 153 are connected with the terminals of the adjacent push button, as shown in Fig. 12. When either push button is depressed to close the circuit, the magnets 63 at that side of the vehicle will be energized to move the latch plates 58 toward the magnets to release the signals. The magnet of the "go slow" signal is interposed in an independent circuit of its own, and the lead wires 94 and 94ª from the magnet belonging to the releasing mechanism of the said signal are connected with the push button 95 on the steering wheel and at the front thereof. This signal 54 may be released by means of the push button 95 whenever desired and in connection with either set of signals, that is, with the signals at the right or those at the left of the vehicle, or independent of either set of signals.

The wiring of the lamp for illuminating the respective signals is shown in Fig. 27. The lamps 66 are arranged in parallel in a circuit consisting of lead wires 99 and 99ª respectively. The battery 93 is arranged in a circuit, as is also a switch 98, the said switch being preferably on the dash adjacent to the push button 96 and in convenient position to be operated by the driver.

It will be noted from an inspection of Fig. 27, that each lamp 66 and the switch 100—102 which operates the lamp to light the same when the signal is swung into operative or danger position, are arranged between the lead wires, that is, each lamp and its switch is in parallel with each other lamp and switch, so that any signal lamp may be operated by its switch without affecting the other lamps, and by means of the switch 98 the circuit of all of the lamps may be simultaneously broken.

A single battery 93 is provided for all of the circuits above specified. Whatever the arrangement of the returning mechanism for the signals, the signals are normally held in safety position by means of releasable latch mechanism. In the construction of Figs. 1 to 11 inclusive, the said mechanism is the latch bar 37, while in the construction of Figs. 11 to 22, the said mecha- nism is the latch plate or bar 58. The bar 37 shown in Fig. 9 may be operated in precisely the same manner as the latch bar 58, if desired.

The operation of the device is as follows:—When the driver intends to turn the vehicle, he will release the signals at that side of the vehicle toward which he intends to turn, by operating the proper push button or other releasing mechanism, as for instance, with the constructions of Figs. 12 to 26, should the driver desire to turn to the right, he will depress the push button 92. The circuit in which the magnets 63 at that side of the vehicle are interposed will thus be closed, and the circuit will be energized, causing the cores of the magnets to operate the latch plates to release the signal.

The springs 57 will swing the signals at that side of the vehicle into operative or danger position. After night or when too dark to see the signals easily, the switch 98 will be closed, so that when the signals swing into operative or danger position the lamps adjacent to the signals will be actuated to illuminate the signals. If desired, the driver will also release the "go slow" signal. While the turn is being made, the switch arm 45 moves over a non-conducting face of the plate 46ª, (with a turn to the right) and the signals are unaffected. As he straightens out the wheels for the straight away, the switch arm 45 moves beneath the contact plate 46ª and in contact with the conducting face thereof, thus closing the circuit through the magnet 69 or through the motor 117 as the case may be. In either case, the returning mechanism is actuated to return the signals.

In Fig. 15 the core moving into the magnet returns the signals while in Fig. 24 the rotation of the motor winding up the flexible member 123 returns the signals. As soon as a signal is in safety position, the catch 59 of the latch bar 58 slips over the roller 60, thus holding the signals in safety position, until they are again released. In case the driver changes his mind about turning after he has displayed the signals, it is only necessary to press the push button 96 in order to restore the signals to safety position. The depression of the button 96 closes the circuit 48—48ª, thus energizing the magnet 69 or the motor 117, and causing the said magnet or motor to return the signals to inoperative position.

In the construction shown in Figs. 1 to 11 inclusive, the movement of the steering wheel to straighten out the wheels after the turn has been made, operates the returning mechanism for the signals mechanically, the steering post positively engaging the returning mechanism to return the signals.

In the construction of Figs. 15 and 24, the movement of the steering post to straighten out the wheels after turning closes the circuit which energizes the returning mechanism, so that the movement of the steering post indirectly operates to return the signals.

It will be noted from an inspection of Figs. 4, 5 and 6, that the sections 16 and 16ª of each of the arms are normally held in alinement by a plate spring 17. There is also a spring 18ª connected with the casing at the outer side of each passage 10, and the free end of each spring is in position to engage the adjacent plunger to insure that the said plunger will be engaged by the adjacent arm 16—16ª, and to hold the said plunger from lateral movement when engaged by the arm.

I claim:—

1. In combination with an automobile, of casings at each side of the frame at the front and the rear, a casing at the center of the rear of the frame, a signal pivoted in each casing, the pivotal connection of each signal being at the lower outer corner, to permit the signal to swing outwardly into approximately horizontal position or inwardly into approximately vertical position, springs acting normally to swing the signals outwardly into operative position, a catch in connection with each signal for normally holding the same in vertical position within the casing, said catches being resilient and normally in position to engage the signal and hold it in vertical position, a magnet adjacent to each catch, the catches being armatures of the magnets, a normally open electric circuit for the magnets of the catches at each side of the frame, a press button on the stering wheel at each side thereof and interposed in the adjacent circuit for closing the circuit to energize the magnets at the said side of the automobile to release the catches, a normally open electric circuit for the magnet of the catch at the center of the rear of the automobile, a press button on the steering wheel at the front thereof and interposed in the circuit for closing the circuit to energize the said magnet, and a common means for simultaneously returning all of the signals to inoperative position, said means comprising a magnet provided with a movable core, a lever pivoted adjacent to the magnet, the core having an opening through which one end of the lever extends to swing the lever when the core is moved into and out of the magnet, a connection between the other end of the lever and sundry of the signals, a connection between the core and sundry of the signals for returning the signals when the core moves into the magnet, a normally open electric circuit in which the winding of the magnet is interposed, means operated by the steering post of the vehicle when the said post is returned to straighten the wheels after the turning of the vehicle, for closing the said circuit to energize the magnet, a switch adjacent to the magnet and interposed in the last-named circuit, a switch arm on the core and coöperating with the switch to retain the circuit closed, while the core is moving into the magnet, means adjacent to the steering post for closing the said circuit independent of the movement of the steering post, an electric lamp adjacent to each signal arranged to illuminate the signal when the signal is in operative position, a normally open electric circuit for all of the said lamps and in which the lamps are arranged in parallel, a switch in connection with each casing and operated by the movement of the signal into operative position for energizing the adjacent lamp, and a switch adjacent to the steering wheel and interposed in the light circuit for closing the same.

2. In combination with an automobile, of casings at each side of the frame at the front and the rear, a signal pivoted in each casing, the pivotal connection of each signal being at the lower outer corner to permit the signal to swing outwardly into approximately horizontal position or inwardly into approximately vertical position, springs acting normally to swing the signals outwardly into operative position, a catch in connection with each signal for normally holding the same in vertical position within the casing, said catch being resilient and normally in position to engage the signal and hold it in vertical position, a magnet adjacent to each catch, the catches being armatures of the magnets, a normally open electric circuit for the magnets of the catches at each side of the frame, a press button on the steering wheel at each side thereof, and interposed in the adjacent circuit for closing the circuit to energize the magnets at the said side of the automobile to release the catches, and a common means for simultaneously returning all of the signals to inoperative position, said means comprising a magnet provided with a movable core, a lever pivoted adjacent to the magnet, the core having an opening through which one end of the lever extends to swing the lever when the core is moved into and out of the magnet, a connection between the other end of the lever and sundry of the signals, a connection between the core and sundry of the signals for returning the signals when the core moves into the magnet, a normally open electric circuit in which the winding of the magnet is interposed, means operated by the steering post of the vehicle when the said post is returned to straighten the wheels after the turning of the vehicle, for closing the said circuit to energize the magnet, a switch adjacent to the magnet and interposed in the last-named circuit, and a switch arm on the core and coöperating with the switch to retain the circuit closed, while the core is moving into the magnet.

3. In combination with an automobile, of casings at each side of the frame at the front and the rear, a casing at the center of the rear of the frame, a signal pivoted in each casing, the pivotal connection of each signal being at the lower outer corner to permit the signal to swing outwardly into approximately horizontal position or inwardly into approximately vertical position, springs acting normally to swing the signals outwardly into operative position, a catch in connection with each signal for normally holding the same in vertical position within the casing, said catches being resilient and normally in position to engage the signal and hold it in vertical position, a magnet adjacent to each catch, the catches being armatures of the magnets, a normally open electric circuit for the magnets of the catches at each side of the frame, a press button on the steering wheel at each side thereof, and interposed in the adjacent circuit for closing the circuit to energize the magnets at the said side of the automobile to release the catches, a common means for simultaneously returning all of the signals to inoperative position, and means operated by the movement of the steering post when returning the wheels to the straight away position to actuate the said common means.

4. In combination with an automobile, of casings at each side of the frame at the front and the rear, a casing at the center of the rear of the frame, a signal pivoted in each casing, the pivotal connection of each signal being at the lower outer corner, to permit the signal to swing outwardly into approximately horizontal position or inwardly into approximately vertical position, springs acting normally to swing the signals outwardly into operative position, and a catch in connection with each signal for normally holding the same in vertical position within the casing, a common means for returning all of the signals to inoperative position, and means operated by the movement of the steering post when returning the wheels to the straight away position to actuate the said common means.

5. In combination with an automobile, of signal casings at each side thereof, a signal pivoted in each casing for swinging movement out of the casing into approximately horizontal position and into the casing into approximately vertical position, a spring in connection with each signal and acting normally to swing the signal outward, a resilient catch in connection with each signal, and arranged to engage the signal when it is swung inwardly and hold the signal in inward position, means for releasing the catches of the signals at each side of the vehicle, means on the steering wheel at each side thereof for actuating the releasing means at the said side of the vehicle, a common means for simultaneously returning all of the signals to inoperative position, and means operated by the movement of the steering post when returning the wheels to the straight away position to actuate the said common returning means, illuminating means adjacent to each signal and arranged to illuminate the signal when the said signal is in operative position, said illuminating means being controlled by the movement of the signal into and out of operative position.

6. In combination with an automobile, of signal casings at each side thereof, a signal pivoted in each casing for swinging movement out of the casing into approximately horizontal position and into the casing into approximately vertical position, a spring in connection with each signal and acting normally to swing the signal outward, a resilient catch in connection with each signal, and arranged to engage the signal when it is swung inwardly and hold the signal in inward position, a common means for releasing the catches of the signals at each side of the vehicle, a common means on the steering wheel at each side thereof for actuating the releasing means at the said side of the vehicle, a common means for simultaneously returning all of the signals to inoperative position, and means operated by the steering post as it is returned to normal position to straighten the wheels of the vehicle after the vehicle has been turned for actuating the said common releasing means.

7. A signaling device for automobiles, comprising in combination with the automobile, of a casing for the signal, a signal pivoted in the casing for swinging out of the casing into approximately horizontal position and into the casing into approximately vertical position, a spring normally acting to swing the signal out of the casing, a resilient catch within the casing and arranged to engage the signal as it moves into the casing and to hold the signal in inoperative position, means for releasing the catch, means controlled by the return movement of the steering post to original position for returning the signals to inoperative position, an illuminating means adjacent to the signal, and means controlled by the movement of the signal into and out of operative position for actuating the illuminating means.

8. A signaling device for automobiles, comprising in combination with the automobile, of a casing for the signal, a signal pivoted in the casing for swinging out of the casing into approximately horizontal position and into the casing into approximately vertical position, a spring normally acting to swing the signal out of the casing, a resilient catch within the casing and arranged to engage the signal as it moves into the casing and to hold the signal in inoperative position, means for releasing the catch, an audible signal adjacent to the signal, means operated by the movement of the signal into operative position for actuating the audible signal, and means controlled by the return of the steering post to normal position after the automobile has been turned for returning the signal to inoperative position.

9. A signaling device for automobiles, comprising in combination with the automobile, of a casing for the signal, a signal pivoted in the casing for swinging out of the casing into approximately horizontal position and into the casing into approximately vertical position, a spring normally acting to swing the signal out of the casing, a resilient catch within the casing and arranged to engage the signal as it moves into the casing and to hold the signal in inoperative position, means for releasing the catch, and means controlled by the return of the steering post to normal position after the vehicle has been turned for returning the signals to inoperative position.

10. A signal for automobiles of the character specified, comprising a casing having one side open, a signal within the casing and pivotally connected thereto to swing into and out of the casing, a spring acting normally to swing the signal outwardly, a resilient catch for holding the signal in inoperative position within the casing, means operable from a distance for releasing the catch, and means, controlled by the return movement of the steering post to normal position, for moving the signal to inoperative position, an illuminating means adjacent to the signal, and controlled by the movement of the signal into and out of the casing.

11. A signal for automobiles of the character specified, comprising a casing having one side open, a signal within the casing and pivotally connected thereto to swing into and out of the casing, a spring acting normally to swing the signal outwardly, a resilient catch for holding the signal in inoperative position within the casing, means operable from a distance for releasing the catch, and means, controlled by the return movement of the steering post to normal position, for moving the signal to inoperative position.

12. A signal system for automobiles, comprising signals pivoted to swing into approximately horizontal or danger position, or into approximately vertical or safety position, springs normally acting to swing the signals into danger position, releasable catches for engaging and holding the signals in inoperative position, means for releasing at will the catch of any desired signal, a common means for returning all of the signals to original position, and means controlled by the movement of the steering wheel of the vehicle for actuating the said returning means.

13. A signal system for automobiles, comprising a casing, a signal pivoted within the casing to swing into and out of exposed position, means acting normally to swing the signal into exposed position, releasable means for holding the signal within the casing, means operable from a distance for releasing the holding means, means for returning the signal to inoperative position within the casing, and means controlled by the return movement of the steering post of the automobile to normal position, for actuating the returning means.

14. A signal system for automobiles, comprising a series of signals pivoted to the automobile for swinging movement into approximately vertical or approximately horizontal position, a spring normally acting to swing each signal into approximately horizontal position, a releasable catch for each signal for holding the signal in approximately vertical position, a common means in connection with the signals at each side of the vehicle for simultaneously returning the said signals to vertical position, and means in connection with the steering post of the automobile and operated by the return of the steering post to normal position after the automobile has been turned for actuating the returning means at the side of the vehicle toward which it has been turned.

WILLIAM EZEKIEL JONES.

Witnesses:
  G. PERRY BOHN,
  EZEKIEL JONES.